F. A. NUGENT.
SOD PULVERIZING MACHINE.
APPLICATION FILED OCT. 14, 1912.
1,062,660.
Patented May 27, 1913.
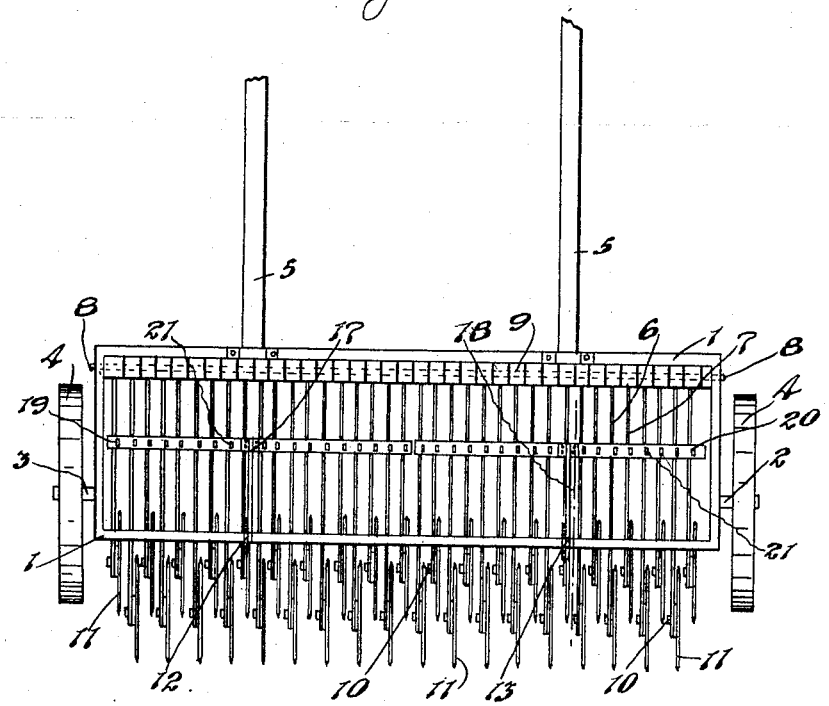
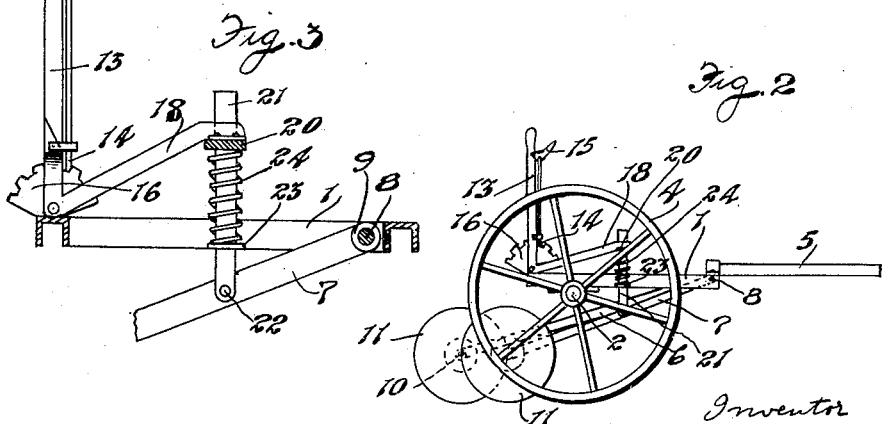

UNITED STATES PATENT OFFICE.

FRANCIS ALBERT NUGENT, OF SANFORD, MANITOBA, CANADA.

SOD-PULVERIZING MACHINE.

1,062,660.  Specification of Letters Patent.  Patented May 27, 1913.

Application filed October 14, 1912. Serial No. 725,581.

*To all whom it may concern:*

Be it known that I, FRANCIS ALBERT NUGENT, of the village of Sanford, in the Province of Manitoba, Canada, have invented certain new and useful Improvements in Sod-Pulverizing Machines, of which the following is the specification.

The invention relates to a sod pulverizing machine and the object of the invention is to provide a machine of the above class which will effectually cut and break up the soil over which it is passed.

It consists essentially in a frame mounted on suitable carriage wheels, sets of long and short drag bars pivotally secured forwardly to the frame said long and short bars being alternately arranged, flat disks pivotally secured to the drag bars and means for applying pressure on the drag bars to depress the disks, the parts being arranged and constructed as hereinafter more particularly described.

Figure 1 is a plan view of the complete machine. Fig. 2 is an end view of the same. Fig. 3 is an enlarged detailed sectional view through the frame showing the construction employed for applying pressure on the drag bars.

In the drawing like characters of reference indicate corresponding parts in each figure.

1 represents a substantially rectangular frame supplied with stub axles 2 and 3 on which I have mounted carriage wheels 4, and 5 represent tongues permanently secured to the frame.

6 and 7 represent sets of long and short drag bars pivotally secured forwardly on a cross rod 8 carried by the frame. The long and short bars are alternately arranged and have their forward ends enlarged at 9 so as to space them apart a set distance. The drag bars carry horizontally disposed pivot pins 10 on which I have mounted flat rotatable disks 11. The disks in actual practice are roughly sixteen inches in diameter and the forward disks or those carried by the short bars are about eight inches in advance of the rear disks or those carried by the long bars. The distance between all the disks is about three inches. On the rear of the frame I have mounted two levers 12 and 13 which levers are supplied with detents 14 and hand latches 15 the detents operating over the quadrants 16 carried by the frame. Arms 17 and 18 extend forwardly from each of the levers and carry respectively pressure bars 19 and 20 located normally some distance above the drag bars.

21 are vertically directed rods pivotally secured to the drag bars at 22 and having their upper ends passing into and through suitable slots formed in the bars 19 and 20 respectively, the rods having enlargements or collars 23 formed thereon at a short distance above their pivot points.

24 are spiral springs inserted on the rods between the collars and the under faces of the respective bars 18 and 19.

The machine is used for breaking up sod after it has been turned by the plow. If desired the machine can be run first across the field in one direction and then across it in a direction at right angles to the latter direction. As the disks are in reality three inches apart it will be seen that the sod will be cut up very finely and the field will be more or less leveled. The operator on the machine will have to adjust the levers to give the necessary pressure on the disks. Stone or weight boxes can be used to hold the machine down but as this is customary no details of this are shown in the drawing.

What I claim as my invention is:—

The combination with a main frame mounted on suitable carriage wheels, of sets of long and short drag bars having their forward ends pivotally secured to the front of the frame, said long and short bars being alternately arranged, flat vertically disposed disks pivotally secured to the rear ends of the drag bars, adjustable levers pivotally mounted on the frame rearwardly, arms extending forwardly from the levers, cross bars pivotally carried by the arms, vertically disposed rods pivotally secured to the drag bars and passing slidably through the cross bars, collars located on the rods and springs located on the rods between the collar and the under faces of the respective bars, as and for the purpose specified.

Signed at Winnipeg, this 4th day of June 1912.

FRANCIS ALBERT NUGENT.

In the presence of—
  G. S. ROXBURGH,
  L. GOULD.

Copies of this patent may be obtained for five cents each, by addressing the "Commissioner of Patents, Washington, D. C."